United States Patent
Lai et al.

(10) Patent No.: US 9,411,816 B2
(45) Date of Patent: Aug. 9, 2016

(54) MAINTAINING CHANNELS LISTS

(71) Applicant: LinkedIn Corporation, Mountain View, CA (US)

(72) Inventors: Albert J. Lai, San Francisco, CA (US); Ankit Gupta, Campbell, CA (US); Gregory W. Bayer, San Francisco, CA (US); Stuart F. Norrie, San Francisco, CA (US); Akshay D. Kothari, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 197 days.

(21) Appl. No.: 14/165,088

(22) Filed: Jan. 27, 2014

(65) Prior Publication Data

US 2015/0112925 A1    Apr. 23, 2015

Related U.S. Application Data

(60) Provisional application No. 61/894,875, filed on Oct. 23, 2013.

(51) Int. Cl.
*G06F 17/30* (2006.01)

(52) U.S. Cl.
CPC .... *G06F 17/30174* (2013.01); *G06F 17/30353* (2013.01); *G06F 17/30575* (2013.01)

(58) Field of Classification Search
CPC ................. G06F 17/30174; G06F 17/30353; G06F 17/30575

USPC ........................................................ 707/610
See application file for complete search history.

(56) References Cited

U.S. PATENT DOCUMENTS

| | | | | |
|---|---|---|---|---|
| 2001/0039584 | A1* | 11/2001 | Nobakht | G06F 17/30884 709/227 |
| 2003/0028876 | A1* | 2/2003 | Eguchi | G06F 13/385 725/38 |
| 2007/0174862 | A1* | 7/2007 | Kushida | H04H 60/33 725/15 |
| 2014/0064303 | A1* | 3/2014 | Aweya | H04J 3/0667 370/509 |

* cited by examiner

*Primary Examiner* — Joshua Bullock
(74) *Attorney, Agent, or Firm* — Park, Vaughan, Fleming & Dowler LLP

(57) ABSTRACT

A method is provided for maintaining a list of content channels that a user of a multi-channel content service subscribes to or has followed, and a client device for operation by the user to receive the content. If a list on the user's device has been modified, the device (e.g., an applet provided by the service) informs a synchronization server by uploading the list. The server synchronizes it with a master list and downloads a copy to the device. A channels list includes an entry for each channel the user follows (and possibly channels he has deleted), which includes an index or ordinal position of the channel among all the user's channels, an identifier of the channel (e.g., a URL), identifiers of sub-lists the channel has been assigned to, and a timestamp identifying the last time the entry changed (e.g., when the channel was added, removed, assigned to a sub-list).

19 Claims, 13 Drawing Sheets

Current Channels List 262

| # | Ch. | URN | Tags | Time |
|---|-----|-----|------|------|
| 1 | B1 | B | Sports | time11 |
| 2 | C | C | Business | time15 |
| 3 | A | A | Sports, Local News | time3 |
| 4 | E | E | Local News | time2 |
| 5 | G | G | Technology | time13 |
| 6 | F | F | Technology | time12 |
| 7 | D | D | - | time14 |

Merged Channels List 270

| # | Ch. | URN | Tags | Time |
|---|-----|-----|------|------|
| 1 | B | B | Sports | time5 |
| 1 | B1 | B | Sports | time11 |
| 2 | C | C | Business, Finance | time8 |
| 2 | C | C | Business | time15 |
| 3 | A | A | Sports, Local News | time3 |
| 3 | A | A | Sports, Local News | time3 |
| 4 | E | E | Local News | time2 |
| 4 | E | E | Local News | time2 |
| 5 | F | F | - | time9 |
| 5 | G | G | Technology | time13 |
| 6 | D | D | Business, Local News | time7 |
| 6 | F | F | Technology | time12 |
| 7 | D | D | - | time14 |

New Master Channels List 272

| # | Ch. | URN | Tags | Time |
|---|-----|-----|------|------|
| 1 | B1 | B | Sports | time11 |
| 2 | C | C | Business | time15 |
| 3 | A | A | Sports, Local News | time3 |
| 4 | E | E | Local News | time2 |
| 5 | G | G | Technology | time13 |
| 6 | F | F | Technology | time12 |
| 7 | D | D | - | time14 |

Master Channels List 242

| # | Ch. | URN | Tags | Time |
|---|-----|-----|------|------|
| 1 | B | B | Sports | time5 |
| 2 | C | C | Business, Finance | time8 |
| 3 | A | A | Sports, Local News | time3 |
| 4 | E | E | Local News | time2 |
| 5 | F | F | - | time9 |
| 6 | D | D | Business, Local News | time7 |

Fig. 2B

Header 918 cliche american apparel. Brooklyn squid you probably not heard of them nisilites nulla, minim kogi enimsi wayfarers est culpa trust fund stumptown craft beer.

Cillum retro officia, plaid iPhone eiusm mod lomo ullamco id. Excepteur Swish meaning anim post-ironic butcher time

Ullamco trust fund salvia. Flannel quills Portland 8-bit officia. Officia vinyl minim al swag, actually aliqua Banksy pug nu genn locavore. Nostrud Neutra Tonxxale wave fashion axe ugh bespoke clichean american apparel. Brooklyn squid you're probably not heard of them nisi nulla

Fig. 9B

MAINTAINING CHANNELS LISTS

RELATED APPLICATION

This application claims priority to U.S. Provisional Patent Application No. 61/894,875, which was filed Oct. 23, 2013 and is incorporated herein by reference.

BACKGROUND

This invention relates to the field of computer systems. More particularly, a system and methods are provided for maintaining a list of content sources, channels, and/or other information.

Websites that serve content to users in different categories or of different types sometimes use an inflexible ordering of those categories or types, which the users cannot change. For example, a website may always provide multiple categories in alphabetical order of the category names, and a user cannot change that order to place their primary interest(s) first. Or, some websites will combine (e.g., interleave) content of different categories in a fixed way for presentation to the user, such as by selecting one item at a time from each category in a fixed order that the user cannot alter.

Even if a website allows a user to re-order content categories or types, the user's changes may not be replicated automatically across all of his or her devices. Thus, a user may take the time to adjust a list of categories exactly to his liking on one device (e.g., a desktop computer). If he then accesses the website from a different device (e.g., a portable computer), he may find that the categories again appear in a default order—that the changes he made on the other device were not replicated.

Or, if a site does allow a user to re-order his interests, and he does so on multiple devices, his changes may not be applied correctly. For example, if he reorders them one way on a first device that is offline and then again on a second offline device, when those devices are again online his changes may not be replicated in the correct order, in which case his most recent changes (which are probably the most accurate and relevant) may be lost.

Not only does this provide the user with a degraded user experience, but may also require the website to store and maintain multiple lists for each user (i.e., for each of the user's devices). For a site that services hundreds of thousands, or millions of users, retaining this much data for each user may not be feasible or may cause a significant expense and/or degrade users' experiences.

DESCRIPTION OF THE FIGURES

FIG. 2B depicts the merger and synchronization of two channels lists, in accordance with some embodiments.

DETAILED DESCRIPTION

Figure 1:
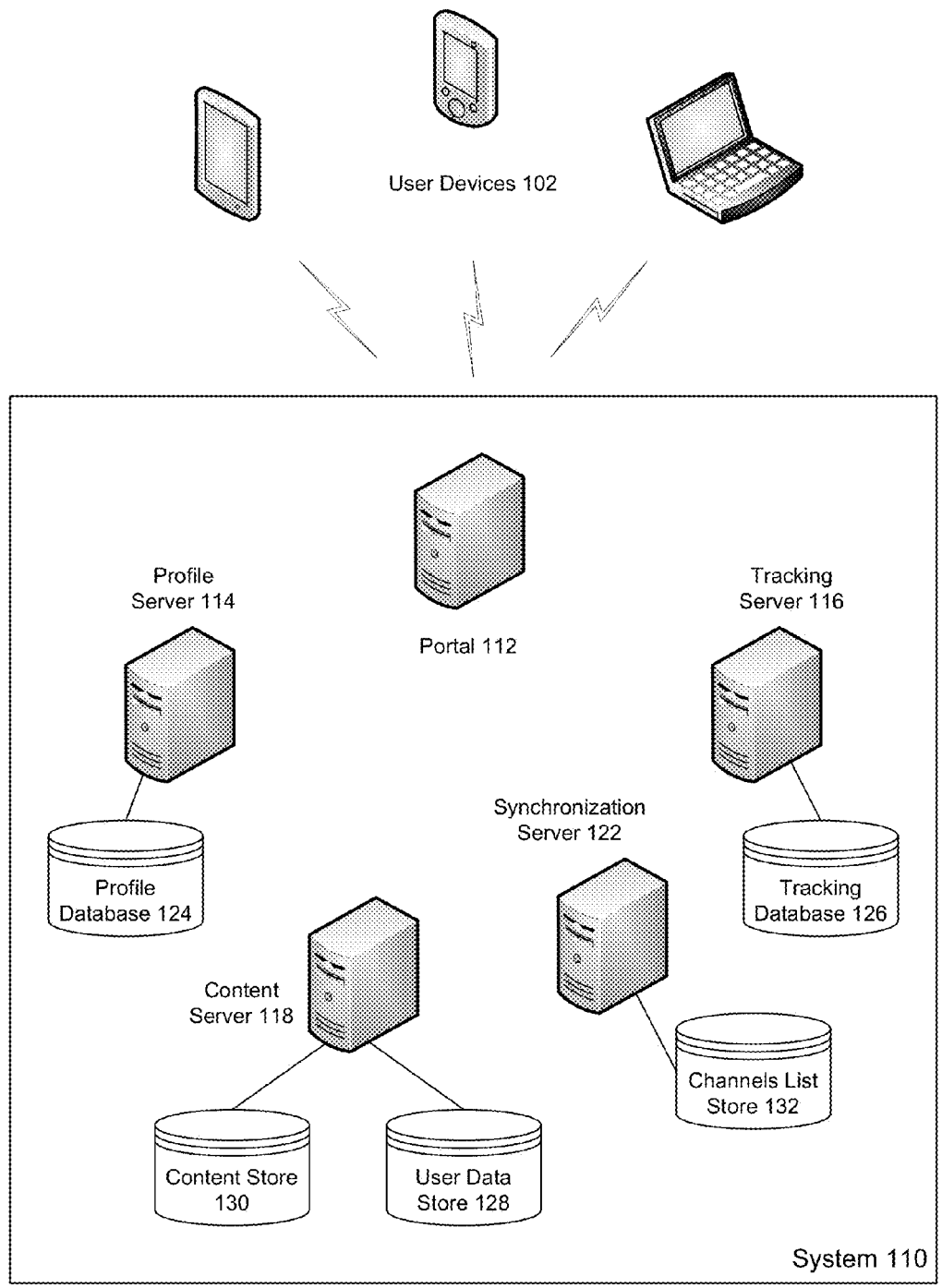
FIG. 1 is a block diagram depicting a content-serving system in which members' channels lists are synchronized, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the invention associated with this disclosure is not intended to be limited to the embodiments shown, but rather is to be accorded the widest scope consistent with the disclosure.

In some embodiments, a system and methods are provided for maintaining a list of multiple content channels on a client device that receives content via the multiple channels. Although the lists comprise content channels (e.g., sources and/or conduits of media content) in the embodiments described below, they may comprise different types of data in other embodiments that may be readily derived from the following discussion.

In these embodiments, a separate master channels list is maintained for each user (e.g., each user of a content-serving service); copies of a user's master channels list are installed on each device operated by or associated with that user when it is used to access the content-serving service, and may be referred to as "current" channels lists to differentiate them from the master.

Client software operating on the devices allows the user to add channels, delete channels, re-order channels, and/or combine channels of a current channels list into one or more sub-lists, which may correspond to different types or categories of content, for example. The configuration of a channels list retains the composition of sub-lists and the user's manual ordering of channels within a single list (i.e., without having to maintain each sub-list separately).

The ordering of channels within a channels list or sub-list may determine the order in which content is offered or presented to the user. For example, when the user connects to the content-serving service, a user interface of his or her device may present the content channels (or content items from the content channels) in the order specified by the user's latest re-ordering. If he or she chooses to view only content within channels of a particular sub-list, that content will also be offered or presented in the order in which the channels appear in the sub-list.

One or more of a user's devices may be offline for some period of time, but the user may continue to alter an offline device's current channels list, and may be able to continue viewing content that was downloaded to the device before it went offline. Therefore, different current channels lists on the user's different devices may be configured differently—to include different channels, different sub-lists, and/or different ordering of channels. When a device is again online with the service, the user's master channels list will be automatically synchronized with the device's current channels list, and changes will be propagated to the user's other devices.

FIG. 1 is a block diagram of a system for maintaining and synchronizing channel lists, according to some embodiments.

System 110 hosts an online service or application for use by operators or users of client devices 102, which execute compatible client applications. A client device may be stationary (e.g., a desktop computer, a workstation) or mobile (e.g., a smart phone, a tablet computer, a laptop computer). A client application may be a browser program or an application (e.g., an applet) designed specifically to access a service offered by system 110. Users of system 110 may be termed members because they may be required to register with the system in order to access all system services or receive all benefits offered by the system.

In some specific embodiments, system 110 hosts a professional networking service or site employed by users to create, develop and maintain professional (and personal) relationships. As part of the service, system 110 serves content for presentation to users via their client devices, and/or links to content served by entities external to system 110, and such content is not limited to social-networking content.

User connections with system 110 are generally made through portal 112, which may comprise one or more web servers, application servers, data servers, and/or other software and hardware modules. System 110 also includes one or more of each of profile server 114, tracking server 116, content server 118, synchronization server 122, profile database 124, tracking database 126, user data store 128, content store 130 and channels list store 132.

Profile server 114 maintains profiles, in profile database 124, of members of the service hosted by system 110. A member's profile may reflect any number of attributes or characteristics of the member, including personal (e.g., gender, age or age range, interests, hobbies), professional (e.g., employment status, job title, employer, skills, endorsements, professional awards), social (e.g., organizations the user is a member of, geographic area of residence, friends), educational (e.g., degree(s), university attended, other training), etc.

Tracking server 116 monitors and records activity of system 110 and/or members (e.g., in tracking database(s) 126). For example, whenever content is served from portal 112 (e.g., to a client device), the tracking server records what is served, to whom (e.g., which member), and when. Similarly, the tracking server also records member actions regarding advertisements and/or other content presented to the members (e.g., clicks, conversions, follow-on requests), to include identities of the member and the content acted upon, what action was taken, when, etc.

Content server 118 maintains one or more repositories of content items for serving to members (e.g., content store 130), an index of the content items, and user store 128. Content store 130 may contain various types of textual and/or graphical or multimedia content, including news, images, documents, video, audio recordings, messages, announcements, advertisements (revenue and/or non-revenue ads), and so on, for serving to members and/or for use by various components of system 110. Content server 118 (or some other component of system 110) may include a recommendation module for recommending content to serve.

When content is stored in content store 130, it may be stored with attributes, indications, characteristics and/or other information describing one or more target audiences (e.g., recipients) of the content. For example, a provider of an advertisement may identify relevant attributes and desired values of target members, a provider of a job listing may identify attributes of members that should be informed of the job opening, an organization wishing to obtain more followers/subscribers/fans may identify the type(s) of members it would like to attract, and so on.

User store 128 stores, for each member of system 110, a record of content items served to the member, or served for presentation to the member, and when they were served. In particular, user store 128 may be configured to allow the content server and/or other components of system 110 to quickly determine whether a particular content item was previously presented to a particular member, how many times it was presented, when it was presented, how it was presented (e.g., how prominently or where it was presented within a web page or other page of content), and/or other information. Although some of this data may duplicate what is stored by tracking server 116, contents of user store 128 are rapidly accessible to one or more servers (especially content server 118), and may be used to help select a content item to serve in response to a current request.

Synchronization server 120, discussed in more detail below, maintains master channels lists for members of system 110. As mentioned previously, a member's master channels list is an ordered (e.g., prioritized) listing of the content channels or sources the member follows or has subscribed to. In particular, each member's master channel list is stored on channel list store 132, and server 120 will synchronize all lists of all devices operated by the member (i.e., on different user devices 102).

System 110 may include other components not illustrated in FIG. 1. Also, in other embodiments, the functionality of the system may be distributed differently among the illustrated components, such as by merging or further dividing functions of one or more components, or may be distributed among a different collection of components. Yet further, while implemented as separate hardware components (e.g., computer servers) in FIG. 1, one or more of front-end server 112, profile server 114, tracking server 116, content server 118 and synchronization server 122 may alternatively be implemented as separate software modules executing on one or more computer servers.

Multi-channel content served to users from system 110 may include content generated or suggested by other members of the system and/or content from third parties. Content provided from system 110 may include member status updates, messages between members, offers from members and/or non-members, advertisements, announcements, job listings, and so on. Content provided to members of system 110 from external entities (which may or may not be members of system 110) may include items from online publications (e.g., news, articles, blogs, RSS (Really Simple Syndication) feeds) and/or other types of websites.

Synchronization server 122 of system 110 helps a user organize and prioritize content preferred by the user, based on channels associated with the content. In particular, each source or conduit of content delivered to a user, whether from system 110 or an entity external to system 110, is identified by or as a content channel. Different channels may be associated with different users, publishers, writers, companies, websites, etc.

For example, one channel may carry news stories from a traditional publisher, such as the Wall Street Journal, Time magazine or a corresponding online publication or website. Another channel may feature a stream of updates from the professional networking service hosted by the system. Yet another channel may be a blog, a site that generates and/or curates content, an RSS feed, electronic mail, or some other source.

A member of system 110 (e.g., a user of the professional networking site) operates an interface provided by the system (e.g., a client application executing on a device 102) to subscribe to or follow content channels that interest her. For each member, the system maintains on synchronization server 122 one master list of content channels associated with that member (e.g., channels the member has subscribed to). In different embodiments, the master channels list may include only third-party content channels (i.e., channels comprising content from entities outside of system 110), only content channels from users/members of system 110 and the system itself, or any content channels available online, both within and without system 110.

The master channels list is downloaded to each client device that the member uses to receive the content she has subscribed to, as a "current" channels list for managing presentation of the content on the device. The member may reorder channels in any or all of her current channels lists any number of times, on any number of devices, and at different times (e.g., even on a device that is offline and not connected to system 110).

In some implementations, the member may also define sub-lists of channels, or use predefined sub-lists, wherein each sub-list includes a subset of the channels she has subscribed to. Illustratively, she may define different sub-lists for different themes or topics (e.g., Local News, Food, Sports, Fashion), and populate each with pertinent channels. One or more sub-lists may be pre-defined for the member (e.g., when the application is installed on her client device).

When a menu of channel sub-lists is offered to the member on one of her devices (e.g., for editing, for viewing content), the menu may include an entry for the device's current channels list (i.e., a sub-list that includes all of the channels the member has subscribed to), which may be pre-defined and called "all channels" or "my channels" or something else. The "all channels" sub-list, and hence the current channels list, can therefore be manipulated the same as any other sub-list (e.g., to add or remove a channel, to change the order of the channels) except, perhaps, that it cannot be deleted.

As already indicated, the order of channels in the master channels list, a current channels list and/or a sub-list may affect the order or priority with which content in the list's or sub-list's channels is presented. Thus, content in the initial or top channels may be presented before content in subsequent or lower channels. In some implementations the client application on a member's device presents channels aligned vertically (and scrollable up and down to access other channels) and, within each channel, content is presented as tiles (representing individual content items) that can be scrolled horizontally to access other content.

In some embodiments, synchronization of a current channels list on one client device with the member's master channels list involves comparing the time-based order in which she reordered channels in the current channels list, created (or deleted) a sub-list, added (or deleted) a channel, and/or made some other modification. Each modification to the current channels list is timestamped, thereby allowing the synchronization server to re-apply those modifications in order so that, for example, if one modification was reversed by a later modification, the correct result emerges.

Figure 2A:
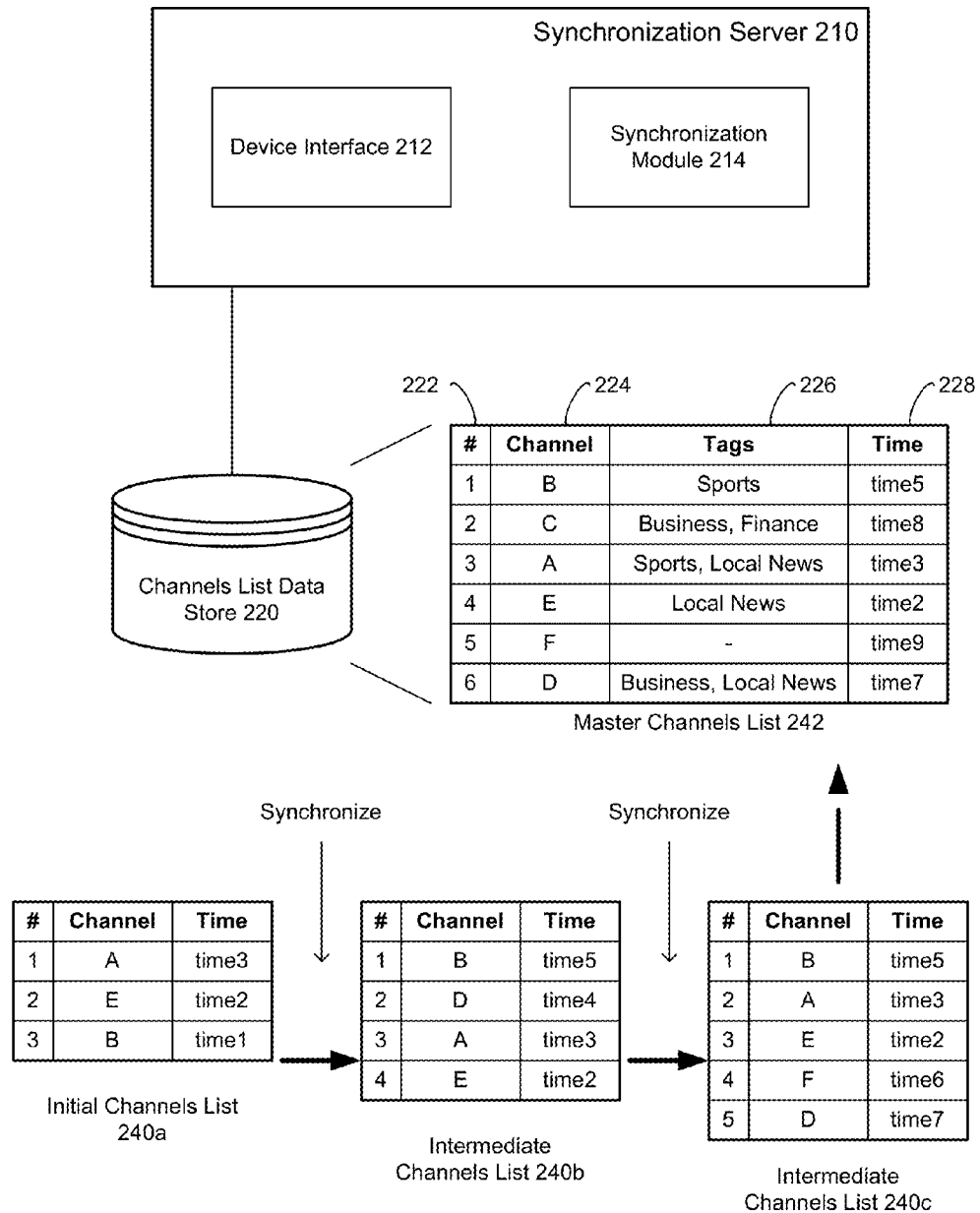
FIG. 2A is a block diagram of a synchronization server and corresponding channels list data store, in accordance with some embodiments.

FIG. 2A is a block diagram of a synchronization server and corresponding channel list data store, according to some embodiments. Although only a single synchronization server 210 and associated channel list store 220 are depicted in FIG. 2A, in other embodiments a system that provides content to users, such as system 110 of FIG. 1, may include one or more of each.

Synchronization server 210 includes device interface 212 for communicating with member devices (e.g., smart phones, portable computers) to receive updates to members' channel lists, download a member's current master channels list (e.g., when he starts using a new device), and/or for other purposes. The synchronization server also includes list synchronization module 214 for merging or synchronizing channels lists.

As described above, a copy of the member's master channels list (stored on channels list data store 220) will be downloaded to all of the member's devices (e.g., during every session). He may make changes to a current channels list (and/or any sub-lists) on any device, even while offline. When a device is connected to the system, and its current channels list has been updated or modified by the member, synchronization module 214 operates to merge those updates with the member's master channels list on data store 220. Updates may be received from multiple devices simultaneously or nearly simultaneously, but will be resolved and merged with the master channels list regardless.

Channels list data store 220 stores each member's current master channels list, an example of which is illustrated as master channels list 242. In some embodiments, a member's master list includes, for each channel that the member is or was subscribed to, index or order field 222, channel field 224, tags 226, and time (or timestamp) 228. In some embodiments, a channels list may include more (or fewer) elements.

For example, a list may include a field, flag, or other element that indicates whether the corresponding channel has been deleted by the corresponding member (i.e., from his current channels list). In these embodiments, deleted channels are retained (permanently or semi-permanently) in case a client device that has been offline for a long time re-connects, so that its current channels list can be correctly synchronized.

In embodiments depicted in FIG. 2A, order field 222 provides an ordered/prioritized listing of the member's channels. In other words, the channel identified as index or order 1 is the highest-priority channel and will generally be presented (e.g., and its content will be presented) before all other channels—both in the master list and in any sub-lists the member has defined. Thus, when the user views his channel listings on a device, the channel having index number 1 will be shown first, at the top of the list or at whatever other position has highest priority.

Similarly, the other channels in list 242 will be presented in order of their index values 222. It should be noted that this ordering and these priorities apply to all the members' sub-lists, so that if the member places one channel above another in one sub-list (thereby indicating that the one channel has higher precedence or priority), that one channel will also be placed above the other channel in the master channels list and all other sub-lists in which they both appear, and above any channels subordinate to the other channel. This allows all the sub-lists to be co-located within a single channels list and not require separate data structures. Instead, the order of channels within the channels list inherently identifies the order of channels within all sub-lists.

Channel field 224 identifies a channel by alphanumeric name, URN (Universal Resource Name), URL (Uniform Resource Locator), network address (e.g., IP address), or some other unique identifier. Tags field 226 identifies sub-lists that the channel belongs to. Although FIG. 2A uses alphabetical topics as tags (e.g., Sports, Local News), in some implementations tags may be codes or tokens that are elsewhere mapped to names by which the member knows and identifies the sub-lists. For example, data store 220 may maintain a separate database, table, or other structure for this purpose.

Time field 228 stores a timestamp that indicates the time/date when the corresponding channel was configured the way it currently appears in the list (e.g., at the specified index number 222 and with the associated tags 226). Thus, every time the member changes the position/order of a channel, or changes the sub-lists it appears in, that channel's record in list 242 will receive a new timestamp.

During the synchronization process, these timestamps are used to replay a member's list updates in order. Therefore, even if the member made conflicting changes, and even if those changes were made on different devices, the changes will be resolved.

To illustrate the synchronization process, an exemplary description of the evolution of master channels list 242 from initial channels list 240a is provided. Initial channels list 240a may have been provided as a default channels list to a member when he first joined a service or system that serves content via multiple content channels (e.g., a professional networking service such as LinkedIn®), or may simply be the member's master list as it appeared at some point in time. Note that tags field 226 is omitted so as to focus on the reordering of list entries and the use of timestamps to ensure appropriate ordering.

The illustrative modifications applied in this process may have originated on the same or different member client devices, but are applied to the master channels list when the responsible device or devices synchronize.

Channels list 240a includes only three channels—A, B, and E. Illustratively, channel B was added as the primary or only channel at time1, while channel E was positioned at time2 and channel A was placed in its current position at time3. Channel A may have been added to the list at time3 (e.g., position 1 may be the default position at which new additions are made), it may have been moved at time3 from a position subordinate to channel B and/or channel E to its current position senior to both channels, or its configuration of tags may have changed at time3 (e.g., because it was added to or removed from a sub-list). Each record includes all data/metadata needed by the system (e.g., index, channel, tags), and so the indicated time identifies the relative order in which each record was configured as it now exists and placed into its current index position.

After initial channels list 240a is assembled (and stored in channels list data store 220), the corresponding member makes some changes to a current channels list on a device. These changes may include adding or deleting a channel, creating or deleting a sub-list, changing the contents (i.e., channels) of a sub-list, re-ordering the channels in a sub-list or in the current channels list, etc. When those updates are uploaded to synchronization server 210 and applied by synchronization module 214, the result is intermediate channels list 240b.

As reflected in list 240b, the member's changes included adding channel D to the channels list at time4, ahead of channel A, and moving channel B to index position 1 at time5. Thus, the changes to the index positions of channels A and E were consequences of the member's actions regarding channels D and B, rather than changes focused on channels A and E; therefore they do not receive new timestamps even though they have changed index positions. In some alternative embodiments, however, consequential changes resulting from a member modification (e.g., such as the change in index positions of channels A and E) may receive separate timestamps—in these embodiments their new timestamps would be later than the timestamp of the intentional action that caused them to move, and would therefore be later than time5.

After intermediate channels list 240b is derived and stored, the corresponding member makes additional changes. When those updates are uploaded to synchronization server 210 and applied by synchronization module 214, the result is intermediate channels list 240c.

One change to the channels list in this iteration is the addition of channel F at time6, at the then-bottom of the list (which would have been index position 5). Subsequently, at time? channel D is demoted (e.g., in a sub-list) to a lower position. For example, it may have been moved below channel E in the "Local News" sub-list.

When channels D and F were added to the channels list, at time4 and time6, respectively, they may have been added to one or more sub-lists or, if the member had not yet defined any sub-lists, were added to the default "all channels" sub-list (i.e., the device's current channels list).

Finally, after one or more additional synchronizations to apply additional list updates made by the member, the channels list takes the form shown in master channels list 242. Of note, at time8 channel C was added at index position 2 (and with tags corresponding to "Business" and "Finance" sub-lists), and at time 9 channel F changed in some way. Because channel F has the same relative position as in intermediate channels list 240c, and because it lacks any tags, it may be surmised that channel F was deleted from whatever sub-list(s) it had appeared in, and/or was deleted directly from the current channels list on the device the user was operating at the time.

As indicated above, a separate field may be used to identify deleted channels in some implementations. Also, a channels list may include one or more channels that have been removed from all user-created sub-lists (or were never placed in any sub-list), but are not deleted. These channels may or may not be displayed when a user views the "all channels" sub-list.

In different embodiments, a new channel may be added differently. In some embodiments, whenever a member follows or subscribes to a new channel, it may automatically be added at the top (i.e., index position 1) of the entire current channels list, and therefore at the top of all sub-lists that the member assigns it to. It may by default be added to all sub-lists, or only to sub-lists specified by the member at the time the channel is added, but the member can easily re-order it and/or change which sub-lists it belongs to.

In other embodiments, if the member is editing a selected sub-list or accessing content of channels within a selected sub-list, if he subscribes to a new channel it may added at the top of the selected sub-list but omitted from any other sub-lists. It will, of course, be included in the "all channels" sub-list (i.e., the current channels list), but not necessarily at the top. For example, it may be added immediately above the channel that had previously been at the top of the selected sub-list.

In some embodiments, when the member adds an existing channel to a new sub-list to which it did not previously belong, it may be automatically placed at the top position (which may cause it to change to corresponding positions in the current channels list and/or other sub-lists also), or it may simply appear at the position that corresponds to its present position in the current channels list or some other sub-list. For example, if any channels subordinate to it in the current channels list already belong to the new sub-list, it may be placed at the position in the sub-list that is immediately above the subordinate channel that it is closest to. If no channels subordinate to it in the current channels list belong to the new sub-list, then it may be placed at the bottom of the sub-list.

Illustratively, a member may find a new channel to follow or subscribe to by using a search or browse tool to review available channels. In some implementations, after selecting a new channel, a member may be able to peruse its content before subscribing to it and/or without ever subscribing to it.

In some embodiments, a member's master channels list (and his devices' current channels lists) will retain entries for channels that were deleted. This may be done for historical tracking and also in case some other long-dormant device of the member is brought on-line. Illustratively, that device's channels list (and one or more sub-lists) may include the deleted channel and the member may or may not proceed to re-order it (thereby indicating an interest in it) just before bringing it online. Depending on the time of the last modification to that channel, synchronization server 210 will take appropriate action to either delete the channel on the long-dormant device's current channels list or apply to the member's master channels list a change the user recently made to the channel.

In some embodiments, synchronization server 210 or some other component of the content-serving system in which the server operates (e.g., system 110 of FIG. 1) maintains identities of devices operated by a member to receive content that is managed via the member's master channels list, as well as the time that each device was last synchronized with the master channels list. In these embodiments, deleted channels/records that have timestamps older than all the times at which the members' devices were last updated can be purged from the master channels list.

Because timestamps are important when synchronizing a device's current channels list with the corresponding master channels list, synchronization server 210 (or some other component of the system in which it operates) may ensure the member's devices are aligned with the server according to time. Illustratively, each time the client application on a client device (e.g., a plug-in associated with the content serving) is activated to receive content via the member's channels, such as each time a member session with system 110 commences, a central time (e.g., a time maintained by synchronization server 210) is provided to the application, which may or may not be adjusted for the member's current time zone. The application calculates the offset between that central time and a local time at the device, but does not change the local time setting, because the member may have adjusted the device's time for some purpose.

Subsequently, each time the member modifies his or her channels list on the device, the time that is assigned to the modification (e.g., and that will be stored in time field 228 in data store 220) is adjusted according to the offset. Therefore, regardless of which device the member uses to update his or her list(s), the updates can be applied at synchronization server 210 in the order the member created them, even if some updates are not received for a relatively long period of time (e.g., because they were entered on an offline device).

A client device's time offset may be updated automatically when its clock is adjusted. In particular, if a user changes the time setting of the device's clock or if it changes automatically (e.g., because he arrived in a different time zone), the saved offset is updated accordingly. For example, if the device's clock was originally found to be two hours and one minute ahead of the central time (e.g., 7,260 seconds), and the user sets his device's clock back one hour (or 3,600 seconds), the offset is adjusted accordingly (e.g., to 3,660 seconds).

In some embodiments, a member's master channels list may be maintained in some other manner than that described with reference to FIG. 2A. Preferably, however, only a single list is maintained for each member of the content-serving service, and is configured (e.g., with tags) to identify sub-lists that the member uses. In these other embodiments, other data may be captured and maintained to assist a synchronization server or other system component in resolving changes to the member's master list. For example, more complete details regarding each change may be recorded, perhaps to capture the entire configuration of the member's sub-lists and/or default/master list every time he or she makes a change.

In some embodiments, a member's modifications to his or her content channels are aggregated and sent from his or her device periodically or regularly, instead of sending each update as it occurs. For example, once a member starts making changes, all the modifications may be captured and reported to a synchronization server some time after the last modification is made, or after a default period of time elapses from the time of the first modification.

Further, the changes may be sent as a new version of the member's channels list, including all necessary contents (i.e., index, channel, tags, time), and not just as a list of changes. Therefore, the synchronization server can synchronize the new version with the version currently stored (e.g., master channels list 242) by applying to the stored version all changes captured in the new version, in time-based order, starting with the oldest change not already reflected in the stored version.

A member device may therefore periodically report either (a) that it has no updates or (b) a new version of the members' channels list. By tracking the time of latest updates received from each device, the synchronization server or other system component can ensure that a new version of the member's master channels list can be disseminated to all devices.

FIG. 2B depicts the merger and synchronization of two channels lists, according to some embodiments, and a new, synchronized, master channels list is generated.

In these embodiments, master channels list 242 of FIG. 2A is synchronized with current channels list 262 from one of the member's client devices (e.g., a smart phone). As a first operation, lists 242, 262 are merged based on the index positions of their channel records; illustratively, the records having the same index positions are sorted based on their timestamps.

Generation of the new, synchronized, master channels list 272 (which eventually will be copied to the client device that provided current channels list 262) can then proceed starting with index position 1 and working downward to place all channels in their appropriate position.

At index position 1, merged channels list 270 has two entries. Channel B1, however, has the same URN as channel B, and because a list may generally have only a single record for each unique URN (or URL or other channel identifier), its newer timestamp allows channel B1 to trump channel B.

At index positions 2-4, both the master channels list and the current channels list had the same channels, and so these records are copied into the new master channels list. Note, however, that channel C was modified on the member's device (i.e., to remove it from the "Finance" sub-list), which gives the channel record from the device a later timestamp and causes that version of channel C to be copied to the new master channels list.

In the competition for index position 5 of new master channels list 272, the record for channel G has a later timestamp and therefore is copied to list 272 instead of the channel F record in which the channel is deleted. In some embodiments, records for deleted channels may always defer to records corresponding to active channels (e.g., regardless of timestamps), and may therefore migrate toward the bottom of the master channels list. In other embodiments, however, records for deleted channels continue to compete for position based solely on timestamp.

For index position 6, the corresponding records from lists 242 and 262 compete, but the record for deleted channel F (at index position 5 of list 242) may also be considered because it lost the competition for index position 5 of the new master channels list and because channel F has not yet been represented in list 272. Comparison of the records' timestamps shows that the channel F record from the client device is newest, and so that record is copies to new master channels list 272. Now that channel F is included in list 272, the other channel F record is obsolete and can be discarded.

Finally, at index position 7 for the new list, the only question is which channel D record to adopt; their timestamps show that the record from current channels list 262 wins.

Figure 3:
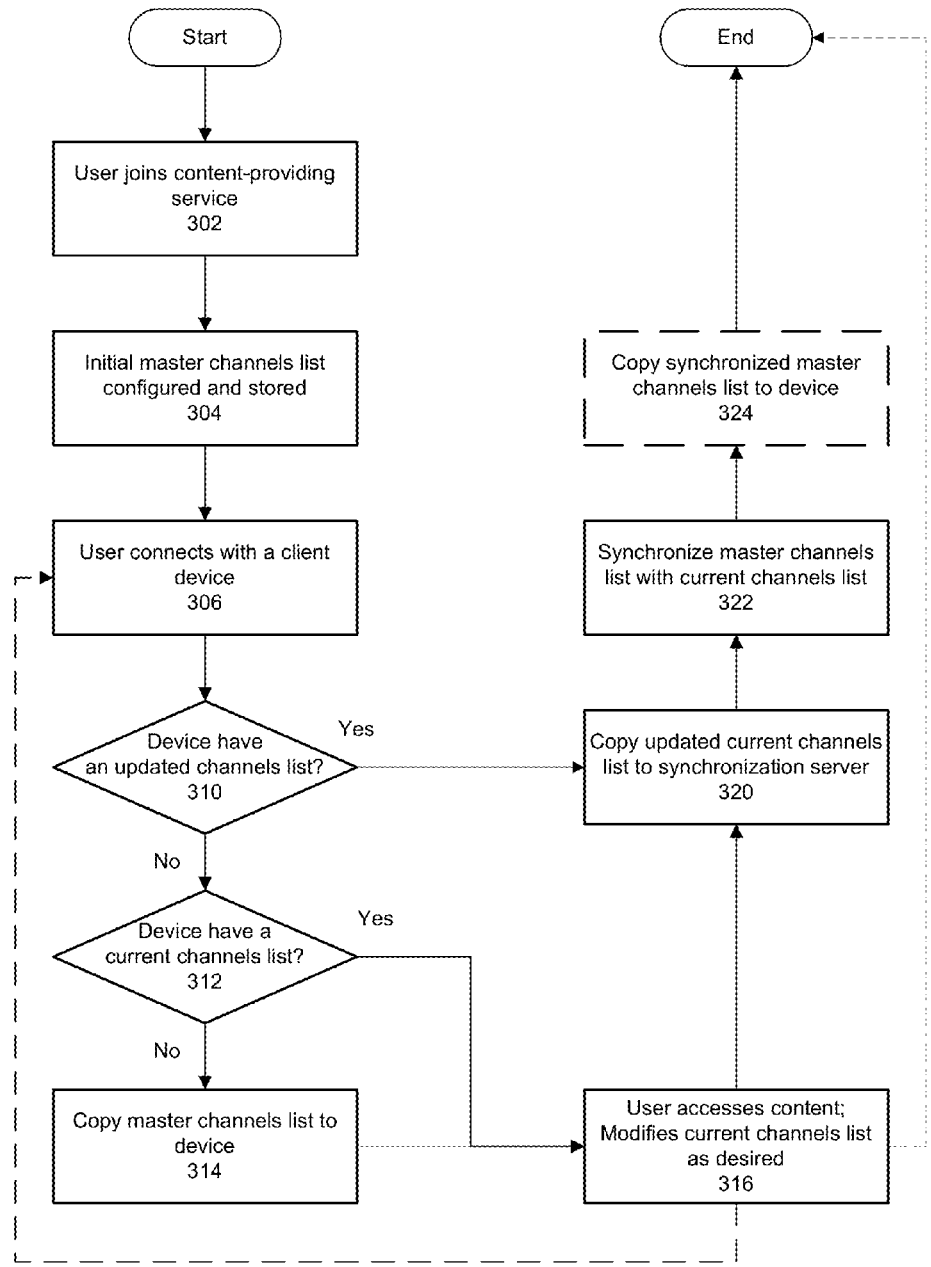
FIG. 3 is a flow chart demonstrating a method of maintaining a member's master channels list and synchronizing it with an updated current channels list received from a member device, in accordance with some embodiments.

FIG. 3 is a flow chart demonstrating a method of maintaining a member's master channels list and synchronizing it with an updated current channels list received from a member device, according to some embodiments.

In operation 302, a user joins a service that supports or manages the serving of multi-channel content (i.e., content from multiple channels). The service may or may not be hosted by or combined with a system that provides other applications and/or services. The user may therefore join just the multi-channel content service or may also join (or already be a member of) an affiliated service.

As part of operation 302, a client application may be installed on a client device operated by the user. The application may include a user interface for presenting the multi-channel content to the user, and may permit the user to arrange and prioritize the channels he subscribes to, to affect how the content is presented to him.

In operation 304, an initial master channels list is created for the user, and is stored and will be maintained by the service (e.g., at a synchronization server such as synchronization server 210 of FIG. 2A). The initial list may be empty or may have some default initial configuration (e.g., with subscriptions to some suggested or sample channels, with one or more predefined sub-lists).

Illustratively, if the multi-channel content service is affiliated with another application or service (e.g., a professional networking service), channels may be prepared based on the user's history with that service. For example, if there are content channels associated with people, companies, organizations, influencers, and/or other entities that the user follows or communicates with via the service, those content channels may be pre-loaded into the user's initial master channels list.

A copy of the initial master channels list may or may not be downloaded to a user device during operation 304. For example, he may join the service from a stationary computing device that he does not expect to use to access the content, in which case the list need not be installed on the computing device.

In operation 306, the user connects to the multi-channel content service via a client device that he will use to consume (e.g., read, watch, listen to) the content. This may entail activating the installed client application, which will automatically connect the device to the service, navigating a browser application to an associated website, and/or taking other action.

In operation 310, the service determines whether the connected device holds a current channels list that includes one or more updates not previously uploaded to the service. Illustratively, every time a device operated by the user connects to the system, it identifies the time the device's current channels list was last updated. Or, the device may simply report whether it has received from the user an update that was not previously reported to the service.

As described above, times reported from the client application to the service (e.g., update timestamps) may reflect an offset between the device's local time and a central time maintained by the service, so that the service can accurately determine the order in which the users' current channels lists are updated (and the order of the updates to a given list).

If the device has an updated current channels list, the method advances to operation 320; otherwise, the method continues at operation 312.

In operation 312, the service determines whether the device has a current channels list. Typically, the only situations in which a user's client device will not have a current channels list are when the device is connected for the first time, when there has been a reconfiguration of the device (e.g., the client application was uninstalled), and when an error occurred (e.g., the device had a hardware failure that corrupted or destroyed the list). If the device has a list, the illustrated method advances to operation 316.

Otherwise, in operation 314 the service downloads a copy of the user's master channels list to the client device.

In operation 316, the user proceeds to use the device to enjoy the multi-channel content and/or to modify his current channels list by adding or removing a channel, adding or removing a sub-list, modifying a channel to add it to or remove it from a sub-list, re-ordering one or more channels, etc. As described previously, moving a channel from one position in the current channels list or a sub-list to another position may cause it to change similarly in the current channels list and all sub-lists.

In the method of FIG. 3, operation 316 is normally followed by operation 320, especially if the user modified his current channels list. Alternatively, the method may return to operation 306 or may end (e.g., if the device goes offline, if he does not modify the current channels list).

In operation 320, the device's current channels list has been modified and the device (e.g., the client application) uploads the modified list or a collection of updates that were applied to the current channels list. In the illustrated embodiments, the device and service always upload the entire modified list (which includes timestamps of all modifications that are reflected in the list), instead of trying to send only the individual updates needed by the service to replicate the user's changes, which would require the device to first determine which changes to upload.

In operation 322, the service (e.g., a synchronization server) synchronizes the user's master channels list with the uploaded current channels list.

In some embodiments in which the device's entire current channels list is updated to the service, the synchronization process may involve the following steps:
 (a) Selecting the oldest entry in the uploaded current channels list (based on their timestamps);
 (b) Identifying the channel corresponding to the selected entry;
 (c) Determining whether the master channels list includes an entry for the identified channel; and:
   (d1) if the master channels list includes an entry for that channel, determining whether the timestamp of the update is newer than the timestamp of the existing entry in the master channels list; and
   (d2) applying the modification to the master channels list only if the update/modification has a newer timestamp;
 OR (e1) if the master channels list does not include an entry for the affected channel, applying the modification to the master channels list; and (f) Repeating (a) through (f) for the next youngest entry, until done.

In some alternative embodiments, synchronization may proceed in order based on channels (e.g., the order of channels in the master channels list or the updated current channels list), instead of by timestamp. In these alternative embodiments, for each channel common to both lists, the service will adopt the channel's record in the updated current channels list if it has a newer timestamp than the channel's record in the master channels list, which may include marking a channel as deleted. Then it will add to the master channels list any channels that are only in the current channels list.

In optional operation 324, the synchronized master channels list is copied to the device. This operation may be optional because the updated current channels list may match the synchronized master channels list. Illustratively, the user may use only a single device to access the multi-channel content and to modify his channels list, in which case the master channels list maintained by the service will be more of a backup, and the device's current channels list will always represent the most current version of the user's configuration.

After operation 324, the method ends.

In some alternative embodiments, two (or more) channels lists are synchronized or merged in some other fashion. For example, in one such alternative procedure, in a first phase all unique channels included in the lists are identified (by URN, URL, or other means). For each channel included in more than one list, the entry or record that has the most recent timestamp is retained; the other(s) is/are discarded. This yields only one entry for each unique channel.

In a second phase, the channels are ordered according to their index values in the list from which their entries were adopted in phase one. Ties (i.e., different channels having the same index position in different lists) are resolved by awarding the contested index position to the entry having the newest timestamp. If any index position is empty, all lower entries are bumped up to make the combined list's entries contiguous.

Figure 4:
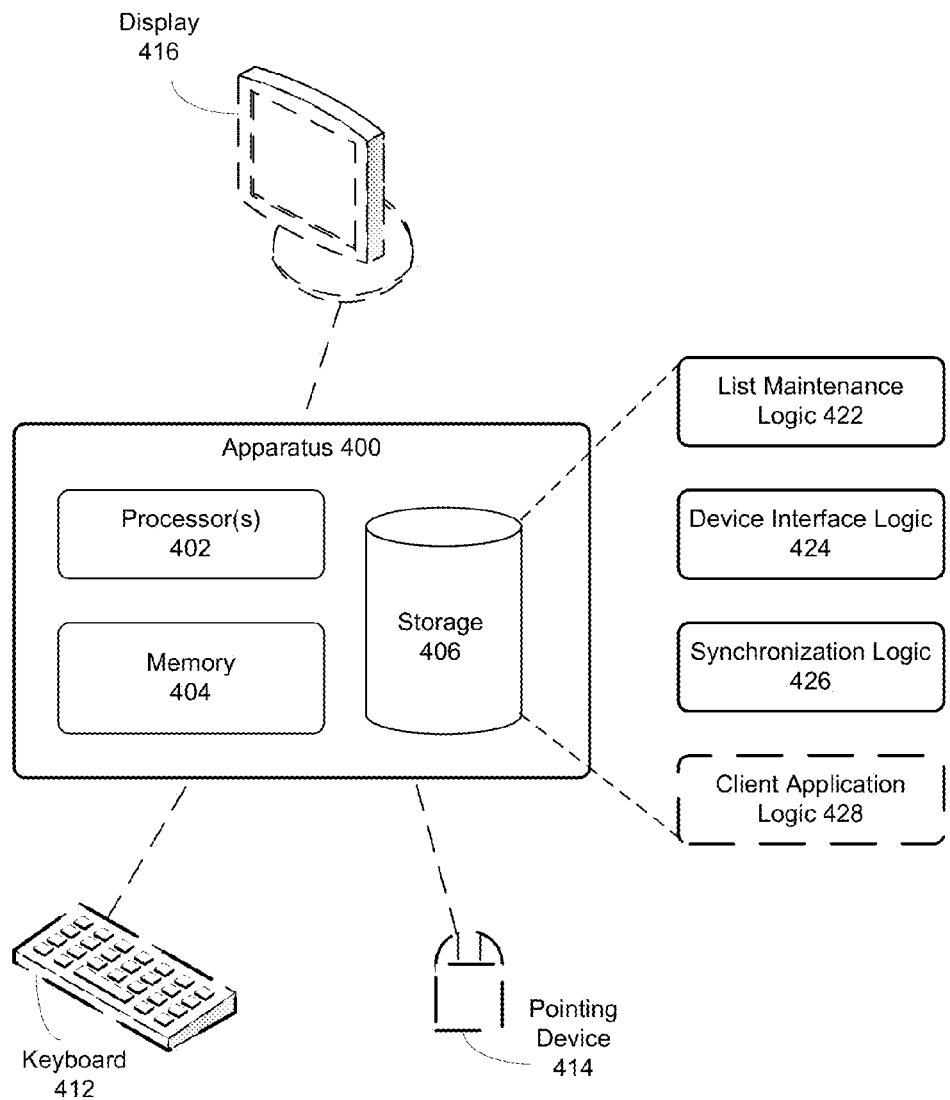
FIG. 4 is a block diagram of an apparatus for maintaining and synchronizing channels lists, in accordance with some embodiments.

FIG. 4 is a block diagram of an apparatus for maintaining and synchronizing channels lists, according to some embodiments.

Synchronization apparatus 400 of FIG. 4 comprises processor(s) 402, memory 404, and storage 406, which may comprise one or more optical, solid-state, and/or magnetic storage components that are co-located or distributed. Apparatus 400 may be coupled (permanently or temporarily) to keyboard 412, pointing device 414, and display 416.

Storage 406 of the apparatus (which may, alternatively, be an external data store) stores master channels lists for all users or members of the content-serving system that encompasses apparatus 400. Storage 406 also stores logic that may be loaded into memory 404 for execution by processor(s) 402. Such logic includes list maintenance logic 422, device interface logic 424, and synchronization logic 426. In other embodiments, any or all of these logic modules may be combined or divided to aggregate or separate their functionality as desired.

List maintenance logic 422 comprises processor-executable instructions for storing master channels lists in storage 406, retrieving the lists, and/or taking other action to maintain users' lists. In some implementations, logic 422 creates or copies a default master channels list for a new user, maps tags (or tokens or other indicia) to sub-list titles defined by users, deletes lists of departed users, etc. In some embodiments, users' master channels lists are maintained on an external storage device (e.g., a channels list data store).

Also in some embodiments, some or all of list maintenance logic 422 (and/or other executable instructions for maintaining a channels list) is downloaded to a user's device (e.g., as part of client software executed on the device for accessing multi-channel content). On the user's device, the logic executes to facilitate updates to the device's current channels list.

In some embodiments, in which synchronization apparatus 400 supports a professional networking service, a user's initial or default master channels list may be configured to include channels associated with members of the service (e.g., companies, organizations, and/or individuals) that the user follows or subscribes to (e.g., in addition to third party content channels that the user subscribes to). In these embodiments, his master channels list may be updated when she follows or subscribes to another member and/or cancels such a relationship with a member. Similarly, within the professional networking service, she may be automatically subscribed to a member corresponding to a content channel that she added to a current channels list (or a sub-list).

Device interface logic 424 comprises processor-executable instructions for interfacing and interacting with users' devices, insofar as necessary to maintain synchronization of one member's master channels lists among all of her devices. This may entail polling the devices to determine if they have updates, receiving notifications of updates (and/or the updated lists), ensuring the devices are provided with the synchronization apparatus' central time, determining the status of a device (e.g., online, offline), etc.

Synchronization logic 426 comprises processor-executable instructions for synchronizing multiple versions of a user's channels list. Normally this may entail synchronizing a master channels list stored on storage 406 with an updated current channels list configured on one user device. However, it may entail synchronizing the master channels list with multiple devices' current channels lists if multiple devices of the user deliver updated lists at approximately the same time.

As described above, synchronization may entail replaying one or more updates captured on a user device, at synchronization apparatus 400, in time-based order. If, however, all of the reported updates have been rendered obsolete by updates that were later in time but were already incorporated into the master channels list, the updates may be ignored.

Optional client application logic 428 is stored on storage 406 for download to client devices operated by users of the multi-channel content system. Different versions of the client application logic may be stored for different types of devices, different models, etc. In some embodiments, the client application logic is stored elsewhere.

In some embodiments of the invention, synchronization apparatus 400 performs most or all of the functions described in relation to synchronization server 122 of system 110 of FIG. 1 and/or synchronization server 210 of FIG. 2A, and such functions may be divided among the same collections of logic depicted in FIG. 4 and/or others. In some particular implementations, apparatus 400 may host multiple virtual computer servers performing synchronization functions described herein.

Users' client devices that are operated to receive multiple channels of content cooperate with a synchronization server to update the synchronization server's master channels list and to receive the master channels list when needed.

Figure 5:
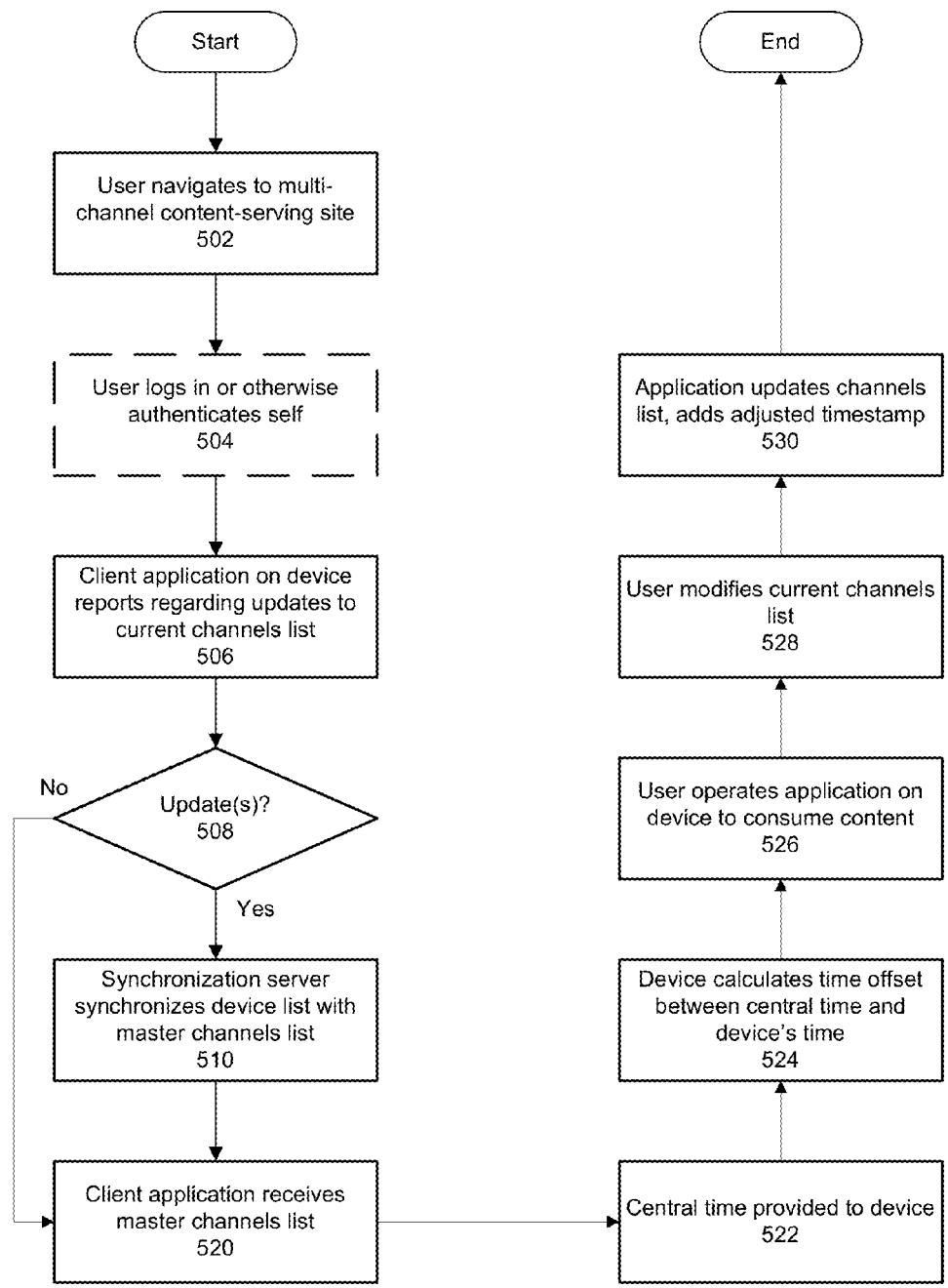
FIG. 5 is a flow chart demonstrating a method of operating a user device for receiving multi-channel content and synchronizing a current channels list with a master channels list, in accordance with some embodiments.

FIG. 5 is a flow chart demonstrating a method of operating a user device for receiving multi-channel content and synchronizing a current channels list with a master channels list, according to some embodiments.

In operation 502, a user navigates to an online system or site that hosts an application that offers or supports delivery of content via multiple channels, such as the service available at www.Pulse.me. This may involve operating a web browser or a dedicated application, applet, or tool to connect to the service.

In optional operation 504, the user may be required to login to authenticate himself before he can use the offered service (s), and maybe before he can install the client application. In some embodiments, however, the user may be able to access the service, receive content, and/or configure a user interface for receiving content with or without logging in.

If user authentication is required, and if the user is currently logged into the multi-channel content-providing service, or a site that hosts or encompasses the service, this may not be necessary because his identity will already be known. For example, in some embodiments the multi-channel content-providing application is compatible with another service, such as a professional networking service provided by LinkedIn® Corporation. In these embodiments, if the user is logged into the service, his authenticated identity may be readily available to the multi-channel content application (and possibly vice versa), and therefore he need not login.

If the user has not already installed a client application that makes the multi-channel content available on his client device, he may do so now. In some implementations, the client application is dedicated to supporting the multi-channel content-providing service, but in other implementations may comprise a web browser or other tool that also supports one or more other services or online applications.

In operation 506, the client application operating on one of the user's device sends to the multi-channel content service (e.g., a synchronization server) one of two things: (a) an indication that the current channels list in use on the device has not been updated since the device last reported to the service, or (b) the current channels list (which has been updated since the device last report to the service). This operation may occur every time the user connects a device to the multi-channel content service (e.g., by activating the client application). Therefore, each user device, when it comes online, either reports that its current channels list has not been updated or sends the updated list.

As described above, a channels list may comprise an ordered list of entries or records, each entry corresponding to one channel the user currently or previously subscribed to. Each entry identifies the corresponding channel, provides the index or position number of the channel, identifies any sub-lists the channel is assigned to (e.g., with tags), and provides a timestamp identifying when the entry was last modified.

A channel's timestamp may be first marked when the channel is added to the channels list, and may be marked again when it is added to a sub-list (in which case a tag may be added to the channel's entry), when it is deleted from a sub-list or the entire channels list (in which case all sub-list tags are removed from the entry), and when it is moved to a different position within the channels list. As described previously, when a channel is moved up or down in a sub-list, it will also change index positions in the current channels list.

In operation 508, subsequent action depends on whether the device sent an updated current channels list. If so, the method continues at operation 510; otherwise, the method advances to operation 520.

In operation 510, the synchronization server receives the device's updated current channels list and merges or synchronizes it with the master channels list maintained by the synchronization server. Synchronization will ensure that the user's master channels list is correctly updated, in time-based order of the updates. In some embodiments, synchronization may entail execution of a process such as that described above in conjunction with FIG. 3.

In operation 520, the synchronization server downloads to the device a copy of the master channels list, which will be adopted as a new or replacement current channels list. Because the master channels list maintained by the synchronization server will reflect all updates received from all of a user's devices, the device will now be up-to-date with all known list modifications made by the user.

In some embodiments, the master channels list may only be downloaded to a device when the device's current channels list differs from the master channels list. This may entail comparison of timestamps identifying the last time either list was updated and/or other action.

In operation 522, the synchronization server or some other component of the multi-channel content service provides the device with a central time (e.g., a current time at the service).

In operation 524, the device calculates the difference between the provided central time and a local time at the device. As described previously, this difference will be applied as an offset to the local device time whenever a timestamp is saved to the current channels list (e.g., to identify when an update was made).

In operation 526, the user operates the application to consume content and/or to modify the application's operation or appearance. Modifications that do not affect the channels list may be applied only on the device, or may be saved (e.g., uploaded) and propagated to other devices operated by the user. Such modifications may include altering a color scheme or skin, setting a bookmark (e.g., to save or mark a content item for later viewing), changing a screen resolution, etc.

In operation 528, however, the user makes at least one change to the current channels list on the device, by adding, removing, or altering a channel. This action may be directed at any sub-list or the overall current channels list (e.g., in the form of the "all channels" sub-list discussed previously).

A new channel may be added at a default position within a selected sub-list or the overall channels list (e.g., at index position 1) or at a position specified by the user. A channel may be removed while viewing any list or sub-list. If removed while viewing the full current channels list (or the "all-channels" sub-list), the channel may disappear from that list and all sub-lists. If removed while viewing a sub-list, it may just disappear from that sub-list or, alternatively, may disappear from all sub-lists.

A channel deleted from the entire current channels list may actually remain in the list, but will not be displayed in the multi-channel content interface (i.e., the user will not see the channel). Illustratively, the channel's entry in the current channels list may be marked (e.g., in the tags field) to reflect its deletion, and be timestamped, but the entry may remain so that the action can be properly synchronized with the user's master channels list.

Altering a channel may involve intentionally changing its position within a sub-list (e.g., by dragging it while viewing the sub-list). As described previously, changing the position of a channel may cause it to change position in the full current channels list and all sub-lists. Because different sub-lists will likely have different numbers of channels, changing it in a first sub-list to put it at a particular index position may place it at a different index position in a second sub-list, but with have the same relative position in the second sub-list that it has in the first. For example, if in the first sub-list it is moved to a position directly before or after a particular channel that also appears in the second list, it will receive that same relative position in the second list. Or, if it was dragged to the top or the bottom of the first list, it may be placed at the top or the bottom of the second list (e.g., and the entire current channels list) also.

In operation 530, in addition to any changes to the tags and index positions of the channel(s) modified in operation 528, the timestamp field for each channel is also updated. In particular, the current time of the device is noted, updated according to the offset calculated in operation 524, and the result is stored as the channel's new timestamp.

After operation 530, the method may end or may return to operation 526 or 528.

In some embodiments, maintenance of a current channels list on a user's client device is handled by a multi-channel content-presentation application operated by the user to access multi-channel content (i.e., content from multiple separate channels that the user subscribes to or follows), which may be (or may be part of) the client application installed on a client device 102 in FIG. 1, and which may perform some or all of the method described in conjunction with FIG. 5.

Figure 6:
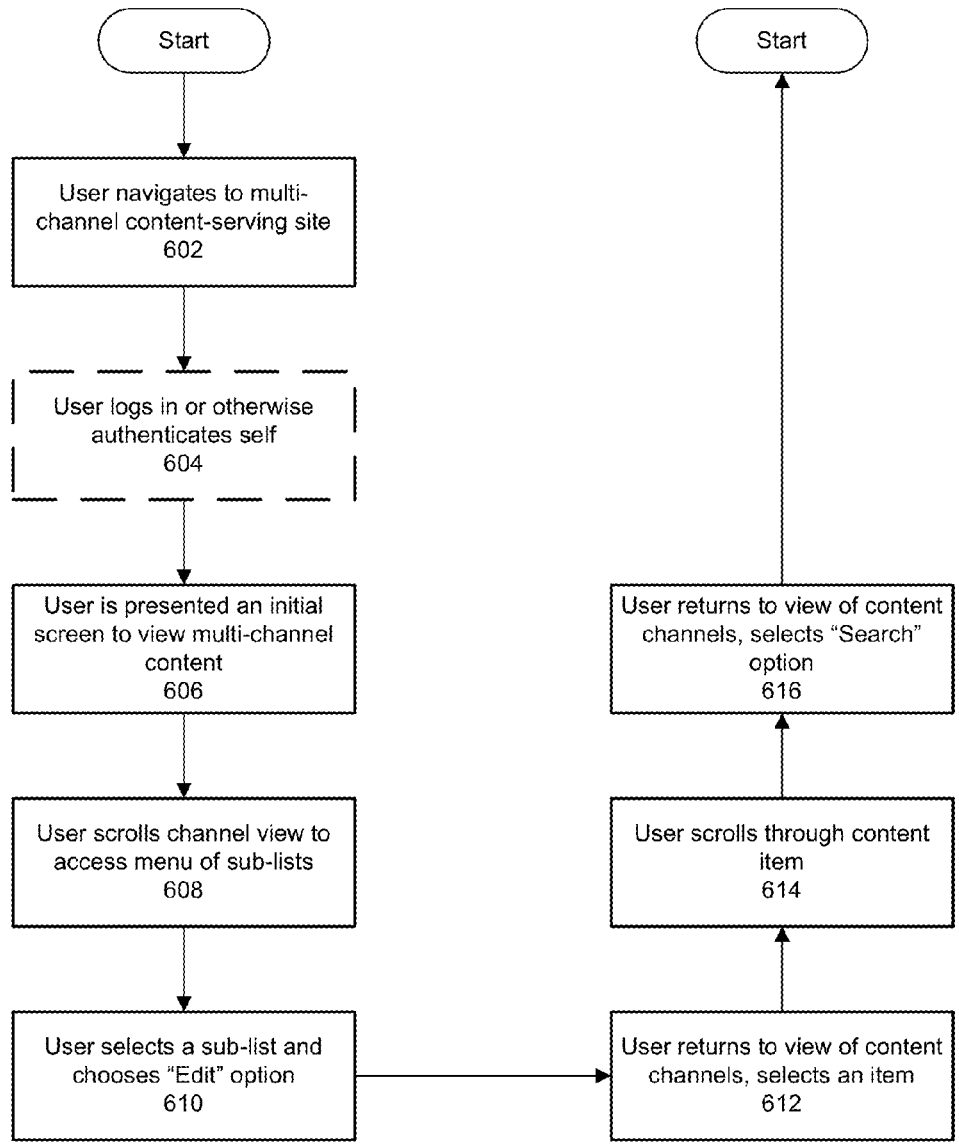
FIG. 6 is a flow chart demonstrating a method of operating a multi-channel content serving application on a user device, in accordance with some embodiments.

FIG. 6 is a flow chart demonstrating a method of operating a multi-channel content-presentation application on a client device, according to some embodiments. Some operations will be described with reference to FIGS. 7-10.

In operation 602, a user navigates to a system or site that offers or supports delivery of content via multiple channels. This may involve operating a client application such as a web browser or a dedicated application, applet, or tool.

In optional operation 604, the user may be required to login to authenticate her identity. If the user is currently logged into the multi-channel content service, or a site that hosts or encompasses the service, this may not be necessary because her identity is already known. In some embodiments, the user may be able to access the service, receive content, and/or configure a user interface for receiving multi-channel content with or without logging in.

If the multi-channel content-presentation application is not already installed on the client device, it may be installed now.

In operation 606, the user activates the multi-channel content-presentation application on the device and is presented with an initial screen, which is configured to allow her to immediately begin consuming (e.g., reading) content. For example, different channels that she has subscribed to or that she follows may be presented in a vertical arrangement, and each of multiple items available in a channel may be arranged horizontally within the channel. The user may be able to scroll through channels in one direction (e.g., vertically) and through content items within a channel in another (e.g., horizontal).

The channels that are displayed are displayed in prioritized order (e.g., according to their index positions in the device's current channels list) of one of multiple sub-lists, including an "all channels" sub-list that includes all of the user's channels, if the user has selected or activated one. Alternatively, the channels may include all active channels in the current channels list (and therefore the "all channels" sub-list)—which are all channels that have not been deleted.

Figure 7:
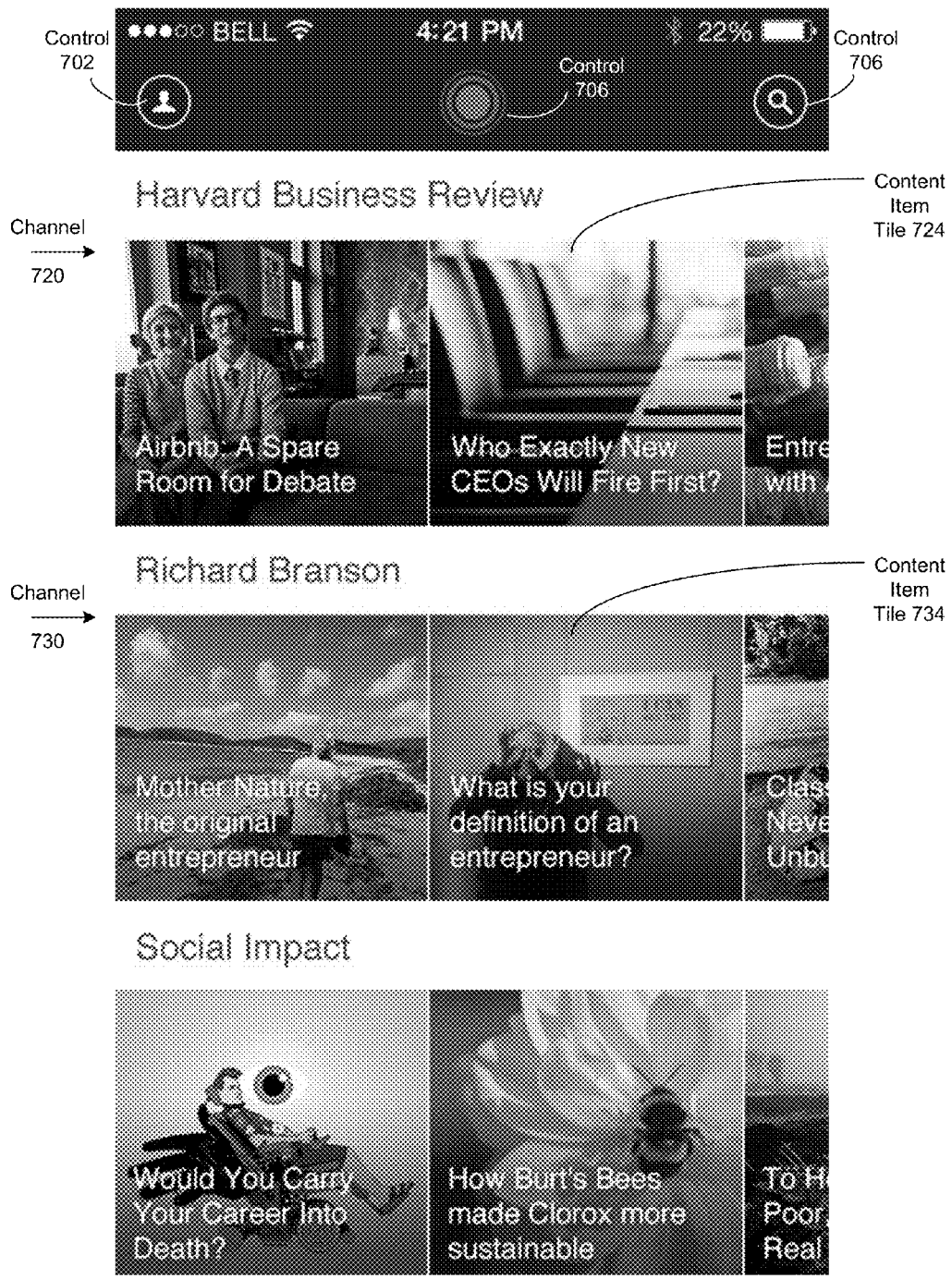
FIGS. 7-10 are screen shots of elements of a user interface for using and/or maintaining a channels list for receiving content items via multiple content channels, in accordance with some embodiments.

FIG. 7 demonstrates an illustrative initial screen, which presents one or more content channels at a time (e.g., channel 720 "Harvard Business Review", channel 730 "Richard Branson") that the user is already following (i.e., they are in her master channels list) or, if the user is not following any channels (e.g., because she is a new user), or less than a threshold number of channels, recommended channels that she may choose to follow. Content items within a particular channel are represented by tiles (e.g., items 724, 734) and a given content item may be opened, played, or otherwise accessed by tapping on its corresponding tile. In some embodiments, tapping on a content item's tile will cause that item to expand and take over all of (or substantially all of) the user interface to present the item's content (e.g., a story, an article, an image).

The user may scroll the display to see additional channels by touching the screen and swiping her finger in one direction (e.g., upward, downward). She may scroll through content items available in a channel by touching the screen (e.g., within a channel's area) and swiping in a different direction (e.g., left, right).

At the top of FIG. 7 (in the header) are controls for viewing the user's profile if she has one and is logged in (control 702), returning to the user's channels (e.g., the initial screen of FIG. 7) from any other screen (control 704—the pulse or target icon), and for searching for new channels and/or other content (control 706).

Figure 8A:
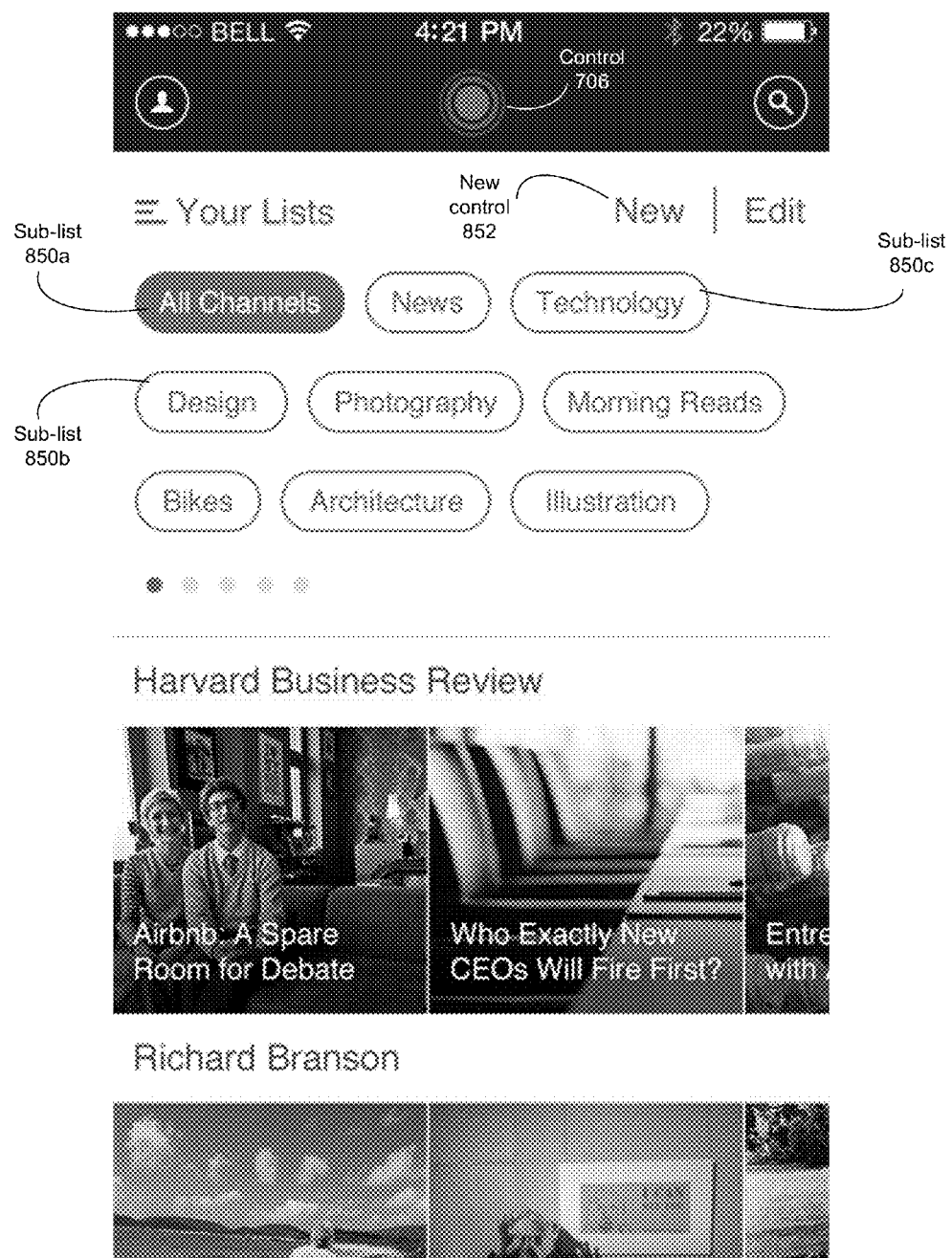

In operation 608 of the flow chart of FIG. 6, and as illustrated in FIG. 8A, when the user swipes downward on the user interface in the initial screen, the display of content channels slides downward to reveal a menu of channel sub-lists that the user has defined and/or that were installed as default sub-lists by the application. If the user was not at the top of the current channels list (or of whichever sub-list is being displayed), swiping downward may instead scroll upward through the channels. After reaching the top of the channels (e.g., the channel having index position 1 in the current channels list), swiping downward will reveal the menu of sub-lists.

In the interface presented in FIG. 8A, the user may select one or more of sub-lists 850 (e.g., "All Channels" sub-list 850a, Design sub-list 850b, Technology sub-list 850c) and then manually slide the channels display back to its original position (or it may return automatically), where it will now be populated with channels in the selected sub-list(s). As described earlier, "All Channels" sub-list 850a is a representation of the device's entire current channels list, and can be manipulated like other sub-lists.

In FIG. 8A, "New" control 852 allows the user to create a new sub-list. Also in FIG. 8A, tapping the "Edit" option allows the user to edit the menu of sub-lists (e.g., to reorder them) and/or to edit a sub-list. The display of sub-lists may be scrollable (e.g., horizontally) to display more sub-lists and/or options regarding the sub-lists.

Figure 8B:
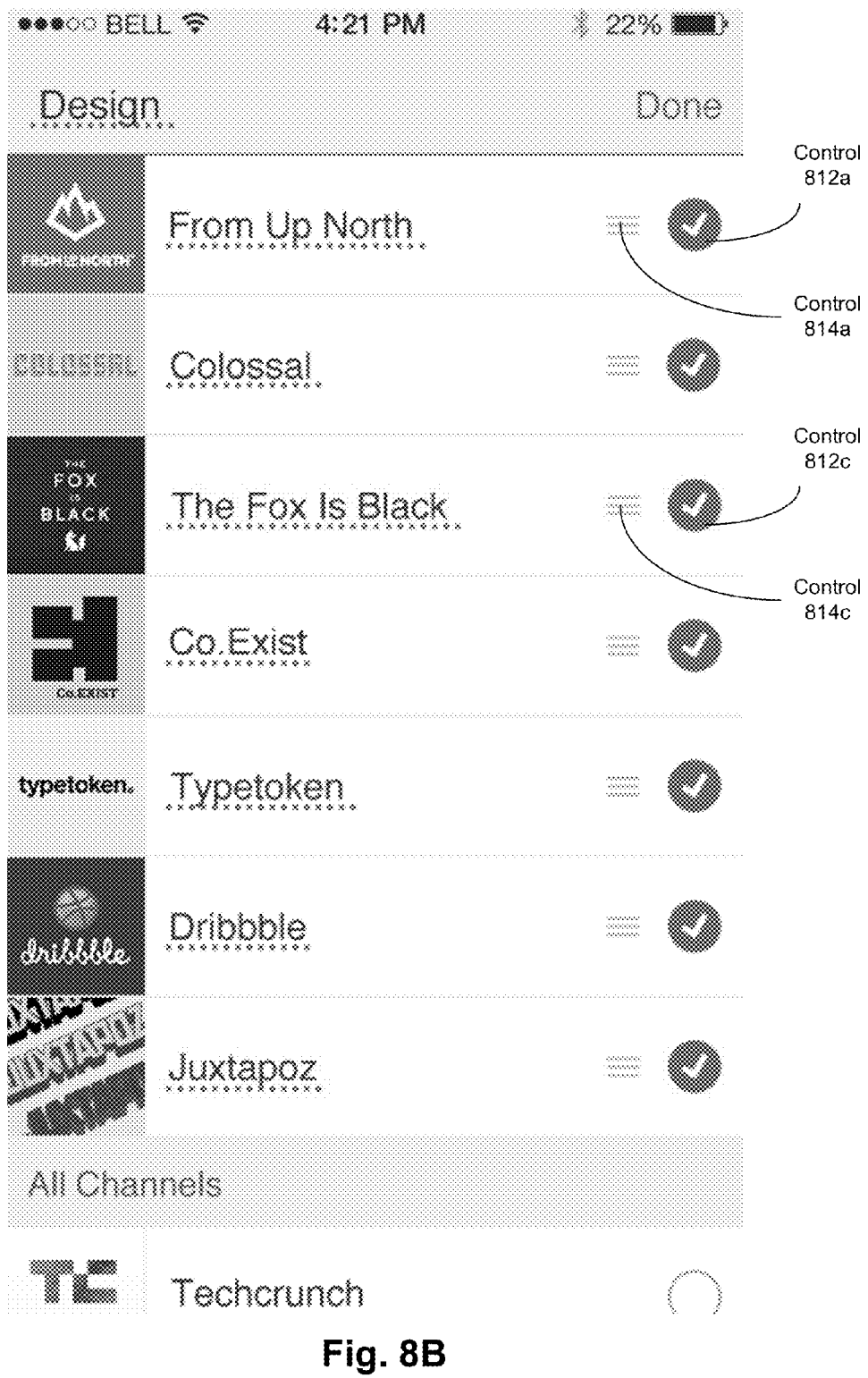

In operation 610 of FIG. 6, the user selects a sub-list in the interface displayed in FIG. 8A (e.g., Design sub-list 850b) taps the Edit option, and is presented with a menu of channels that are currently assigned to the sub-list, as depicted in FIG. 8B for example. In FIG. 8B, the name of the sub-list can be edited (as indicated by the dotted underline beneath the "Design" heading), as can names of the channels. With each channel is presented an option 812 (e.g., control 812a) to un-follow, unsubscribe or remove the channel from the sub-list (and possibly the master channels list/"All Channels" sub-list), and one or more options 814 (e.g., option 814a) to return to a previous view (e.g., the initial screen, the menu of sub-lists).

The interface displayed in FIG. 8B may be scrollable vertically, to access and potentially edit other sub-lists, select a channel (e.g., from the "All Channels" sub-list) to add to the Design sub-list, and/or for some other purpose.

In operation 612 of FIG. 6, from the interface of FIG. 8A or FIG. 8B the user returns to a view of her channels (e.g., the initial screen of FIG. 7), such as by activating control 706 or a control 812, or by swiping upward on the menu view, and taps on a content item's tile (e.g., content item tile 724).

Figure 9A:
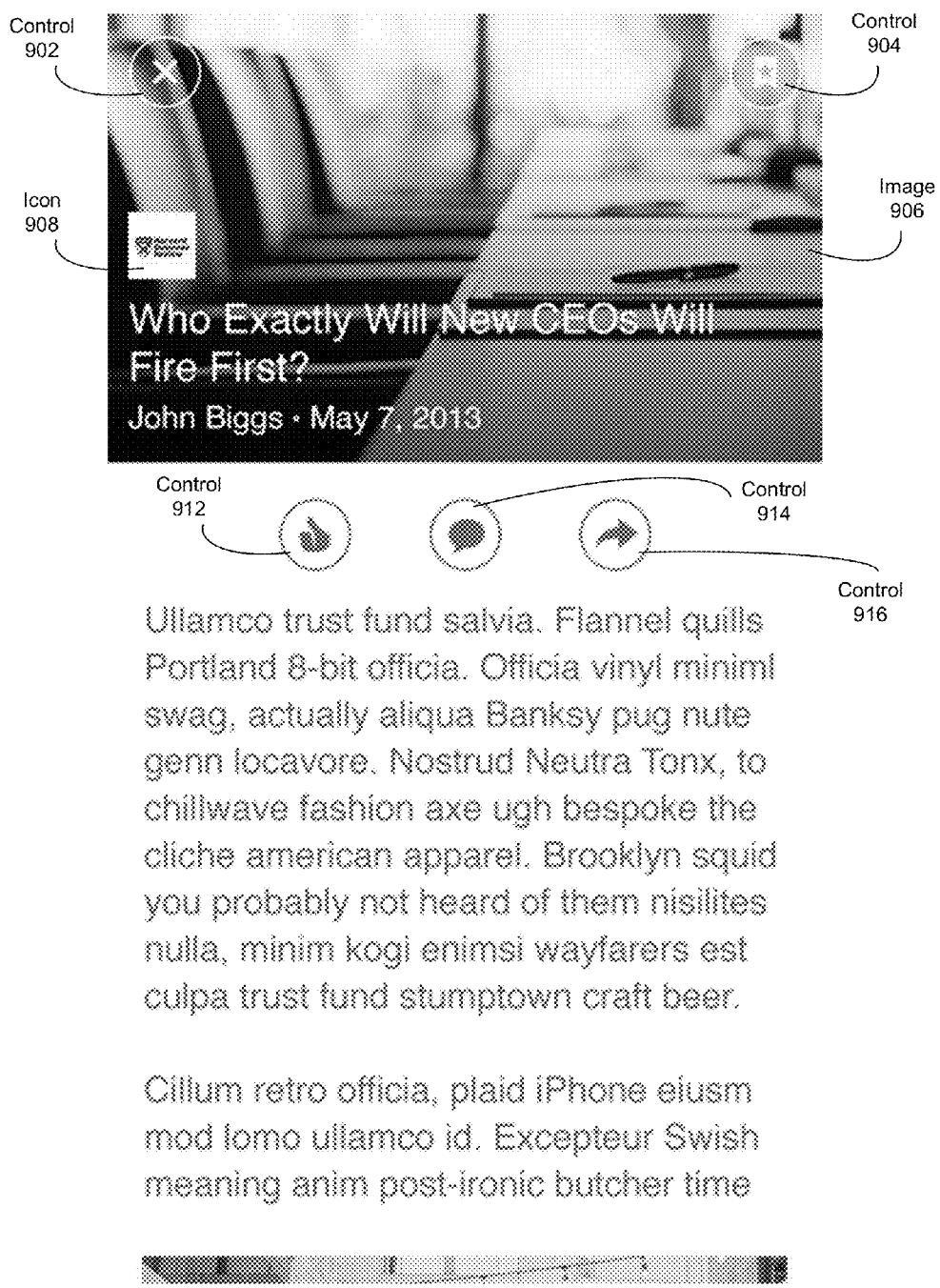
Figure 10:
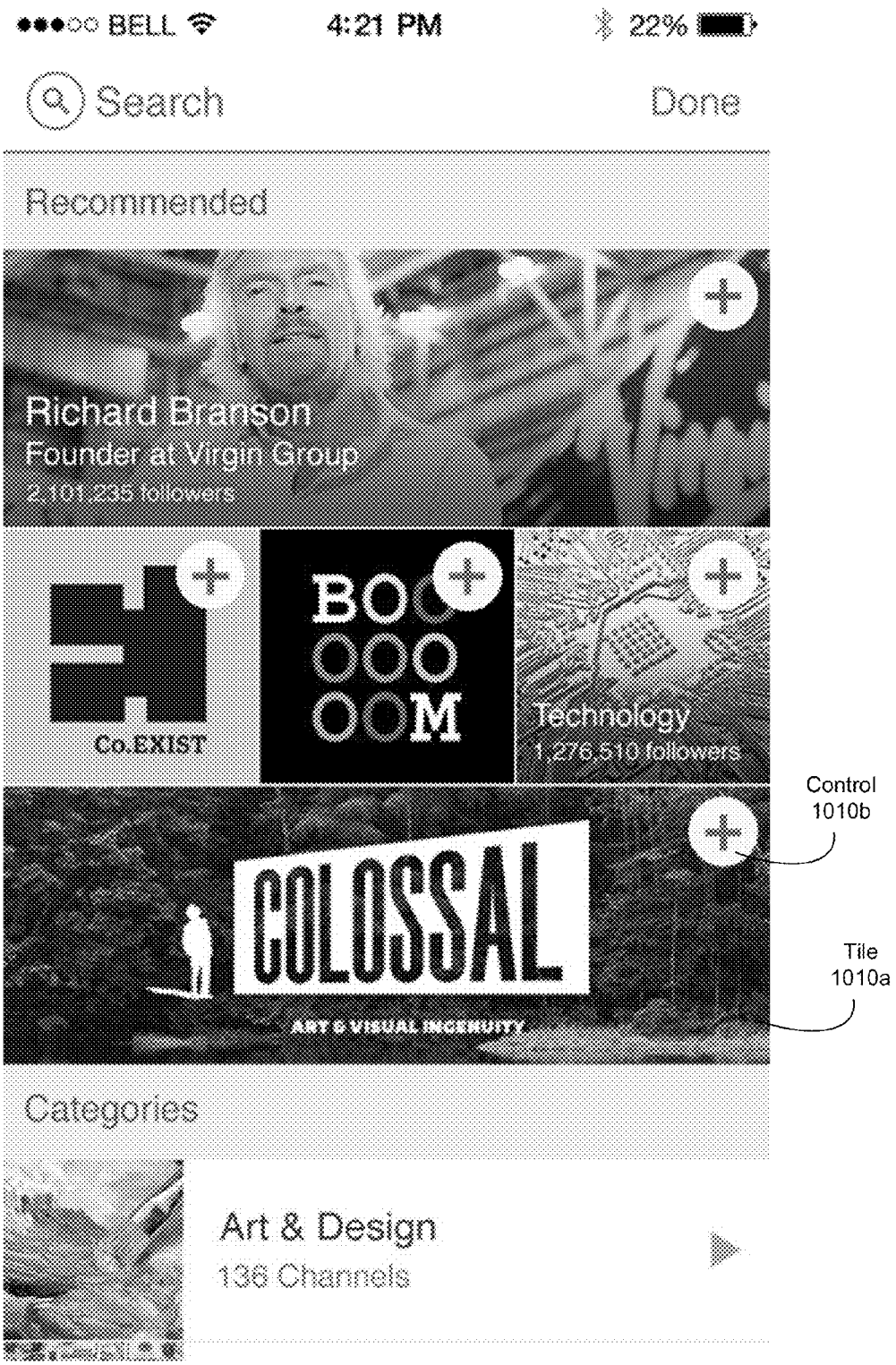

As shown in FIG. 9A, the content item expands over the display of channels until it occupies the entire screen, possibly including any controls/indicators associated with the device (e.g., a signal strength indicator, a battery charge indicator, a clock). The header of the content item includes control 902 for closing the item (and returning to the previous screen), which causes the item's tile to shrink to its original size and position, and control 904 for bookmarking or saving the content item.

An image associated with the content item (if an image is provided), such as image 906 is overlaid with a representation (e.g., icon 908) of the publisher or channel, the title of the item, the author, and the date of the item (or whichever portions of this data are available). Below the image and above the text of the content item are controls for liking or indicating a preference for the item (control 912), for making a comment and/or viewing previous comments (control 914), and for sharing the item (control 916).

In operation 614, the user swipes the user interface (e.g., upward) to scroll through the content item. Controls 912, 914, 916 scroll with the text until they meet and stick to the header (e.g., header 918), as shown in FIG. 9B. It may be noted that whereas the content scrolled over the header initially, after these three controls merge with the header the content scrolls below the header (and the header remains visible with the multiple controls).

In operation 616, the user returns to a screen to view her channels (e.g., the initial screen displayed in FIG. 7), and selects search control 706 to search for additional content channels. She is presented an interface such as the one depicted in FIG. 10. In this interface, each tile (e.g., tile 1010a) represents a content channel and includes a control (e.g., control 1010b) for following/subscribing to the channel and information identifying the channel or a source of the channel.

Activating the control adds the channel to her channels list. She may be prompted to associate it with one or more sub-lists immediately, and/or she may be able to access the menu of sub-lists (e.g., of FIG. 8A) at any time to do so. The control for subscribing to a channel, when selected, may change to show that the action is complete (e.g., from a "+" sign to a "✓" mark). Tapping on a channel's tile may open the channel to allow the user to see a sample of the content items available via the channel.

After operation 616 the method ends or the user returns to a view of her channels to enjoy her content or to revise her current channels list.

An environment in which some embodiments are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of maintaining a list of multiple channels of content received on a client device, the method comprising, at the client device:
   receiving the list of channels, within which each channel is represented by a channel record comprising:
      an index position of the channel within the list;
      an identifier of the channel;
      identifiers of sub-lists to which the channel has been assigned, if any; and
      a timestamp of a most recent modification to the channel record;
   displaying content received via the channels, in priority order based on the index positions of the channels within the list;
   receiving a modification to the list of channels, wherein the modification comprises creating a first channel record to represent a first channel, the first channel record including:
      an identifier of the first channel;
      a first timestamp identifying a time of the modification; and
      if the first channel is added to a sub-list, an identifier of the sub-list to which the first channel is added;
   wherein the modification yields a modified list of channels; and
   transmitting the modified list of channels for synchronization with a master list of channels.

2. The method of claim 1, further comprising:
   receiving a central time of a multi-channel service that maintains the master list of channels; and
   calculating an offset between the central time and a local time of the client device;
   wherein the first timestamp identifies the local time of the client device at the time of the modification of the first channel combined with the calculated offset.

3. The method of claim 1, wherein said displaying comprises:
   receiving from a user of the client device a selection of a first sub-list of channels;

presenting to the user a display of the first sub-list of channels, wherein the displayed channels are arranged in a first direction in order of the channels' index positions and the display is scrollable in the first direction to display additional channels; and within a given displayed channel, presenting multiple content items scrollable in a second direction orthogonal to the first direction.

4. The method of claim 3, further comprising:

receiving a further modification comprising movement of the first channel in the first sub-list of channels from a first position to a second position; and modifying the first channel record to change the index position of the first channel record;

wherein after the further modification the first channel is displayed in a different position in the list of channels and in all sub-lists, compared to prior to the further modification.

5. The method of claim 1, wherein the index position of a given channel in the list determines an order in which the given channel is displayed within the list and within every sub-list.

6. The method of claim 1, wherein the list of channels is received from a multi-channel content service that maintains the master list of channels, the method further comprising:

connecting to the multi-channel content service to receive the list of channels; and upon every connection to the multi-channel content service, transmitting only one of:

a first signal indicating that the list of channels has not been updated on the client device; and a second signal indicating that the list of channels has been updated since the last connection to the multi-channel content service.

7. The method of claim 6, wherein the second signal comprises the list of channels.

8. The method of claim 1, wherein the modification is received while the client device is offline.

9. The method of claim 1, wherein:

transmitting the modified list of channels for synchronization comprises transmitting the modified list of channels to an online multi-channel content service that maintains the master list of channels; and the online multi-channel content service causes an affiliated professional social network to modify a profile of the user to include following a member of the professional social network associated with the first channel.

10. The method of claim 9, wherein the synchronization comprises:

adding to the master channels list one or more channels associated with members of the professional social network followed by the user.

11. A device for maintaining a list of channels of content received by the device, the device comprising:

one or more processors; and memory storing instructions that, when executed by the one or more processors, cause the device to:

connect the device to an online multi-channel content service;

transmit to the online service only one of:

an indication that the channels list has not been modified; and the channels list;

wherein the channels list comprises a channel record for each of the multiple channels, each channel record comprising:

an identifier of a corresponding channel;

an index position of the corresponding channel; and identifiers of sub-lists to which the channel has been assigned, if any; and a timestamp identifying a last time the channel record was modified;

receive as a replacement channels list a master channels list maintained by the online service;

receive a central time of the online service;

calculate an offset between the central time and a local time of the device;

receive from a user of the device a deletion of a first channel; and modify a first channel record corresponding to the first channel to:

delete identifiers of any channels sub-lists the first channel was assigned to; and store a new timestamp identifying a time of the deletion;

wherein the first channel record is not deleted; and wherein the new timestamp is based on a combination of a current local time and the offset.

12. The device of claim 11, wherein the memory further stores the channels list.

13. The device of claim 11, wherein the memory further stores instructions that, when executed by the one or more processors, cause the device to:

display multiple channels from the channels list, in a prioritized order and scrollable in a first direction; and display, for each of the multiple channels, multiple content items from a source of the channel, wherein the multiple content items are scrollable in a second direction substantially orthogonal to the first direction.

14. A method of maintaining a list of multiple channels of content received on a client device, the method comprising, at the client device:

receiving the list of channels, within which each channel is represented by a channel record comprising:

an index position of the channel within the list;

an identifier of the channel;

identifiers of sub-lists to which the channel has been assigned, if any; and a timestamp of a most recent modification to the channel record;

displaying content received via the channels, in priority order based on the index positions of the channels within the list, wherein said displaying comprises:

receiving from a user of the client device a selection of a first sub-list of channels;

presenting to the user a display of the first sub-list of channels, wherein the displayed channels are arranged in a first direction in order of the channels' index positions and the display is scrollable in the first direction to display additional channels; and within a given displayed channel, presenting multiple content items scrollable in a second direction orthogonal to the first direction;

receiving a modification to the list of channels, wherein the modification comprises movement of the first channel in a first sub-list of channels from a first position to a second position;

modifying a first channel record representing the first channel to change the index position of the first channel record in the list of channels, wherein after the modification, the first channel is displayed in a different position in the list of channels and all sub-lists to which the first channel had been added, compared to prior to the modification; and transmitting the list of channels for synchronization with a master list of channels.

15. The method of claim 14, wherein the list of channels is received from a multi-channel content service that maintains the master list of channels, the method further comprising:
connecting to the multi-channel content service to receive the list of channels; and
upon every connection to the multi-channel content service, transmitting only one of:
a first signal indicating that the list of channels has not been updated on the client device; and
a second signal indicating that the list of channels has been updated since the last connection to the multi-channel content service.

16. A method of maintaining a list of multiple channels of content received on a client device, the method comprising, at the client device:
receiving the list of channels, within which each channel is represented by a channel record comprising:
an index position of the channel within the list;
an identifier of the channel;
identifiers of sub-lists to which the channel has been assigned, if any; and
a timestamp of a most recent modification to the channel record;
displaying content received via the channels, in priority order based on the index positions of the channels within the list;
receiving a modification to the list of channels, wherein the modification comprises deletion of a first channel;
modifying a first channel record representing the first channel to:
delete identifiers of any sub-lists the first channel was assigned to; and
store a new timestamp identifying a time of the deletion;
wherein the first channel record is not deleted; and
transmitting the list of channels for synchronization with a master list of channels.

17. The method of claim 16, wherein the list of channels is received from a multi-channel content service that maintains the master list of channels, the method further comprising:
connecting to the multi-channel content service to receive the list of channels; and
upon every connection to the multi-channel content service, transmitting only one of:
a first signal indicating that the list of channels has not been updated on the client device; and
a second signal indicating that the list of channels has been updated since the last connection to the multi-channel content service.

18. A method of maintaining a list of multiple channels of content received on a client device, the method comprising, at the client device:
connecting to an online multi-channel content service;
transmitting to the online service only one of:
an indication that the channels list has not been modified; and
the channels list;
receiving as a replacement channels list a master channels list maintained by the online service;
receiving a central time of the online service;
calculating an offset between the central time and a local time of the device;
receiving from a user of the device a modification of a first channel in the channels list; and
modifying a first channel record corresponding to the first channel by:
when the modification is addition of the first channel:
creating the first channel record, to include an identifier of the first channel; and
if the first channel is added to a first sub-list of channels, storing in the first channel record an identifier of the first sub-list;
when the modification is movement of the first channel, in the first sub-list, from a first position to a second position:
modify the first channel record to change the index position of the first channel record;
wherein after the modification, the first channel is displayed in a different position in the list of channels and in all sub-lists to which it had been added, compared to before the modification; and
when the modification is deletion of the first channel:
delete from the first channel record identifiers of any sub-lists the first channel was assigned to;
wherein the first channel record is not deleted; and
storing in the first channel record a timestamp of the modification, based on a combination of a current time and the offset.

19. A device for maintaining a list of channels of content received by the device, the device comprising:
one or more processors; and
memory storing instructions that, when executed by the one or more processors, cause the device to:
connect to an online multi-channel content service;
transmit to the online service only one of:
an indication that the channels list has not been modified; and
the channels list;
receive as a replacement channels list a master channels list maintained by the online service;
receive a central time of the online service;
calculate an offset between the central time and a local time of the device;
receive from a user of the device a modification of a first channel in the channels list; and
modify a first channel record corresponding to the first channel by:
when the modification is addition of the first channel:
creating the first channel record, to include an identifier of the first channel; and
if the first channel is added to a first sub-list of channels, storing in the first channel record an identifier of the first sub-list;
when the modification is movement of the first channel, in the first sub-list, from a first position to a second position:
modify the first channel record to change the index position of the first channel record;
wherein after the modification, the first channel is displayed in a different position in the list of channels and in all sub-lists to which it had been added, compared to before the modification; and
when the modification is deletion of the first channel:
delete from the first channel record identifiers of any sub-lists the first channel was assigned to;
wherein the first channel record is not deleted; and
store in the first channel record a timestamp of the modification, based on a combination of a current time and the offset.

* * * * *